Dec. 5, 1933.   A. L. STEWART ET AL   1,937,727
METHOD OF AND MACHINE FOR PRODUCING GEARS
Filed Oct. 8, 1931   2 Sheets-Sheet 1
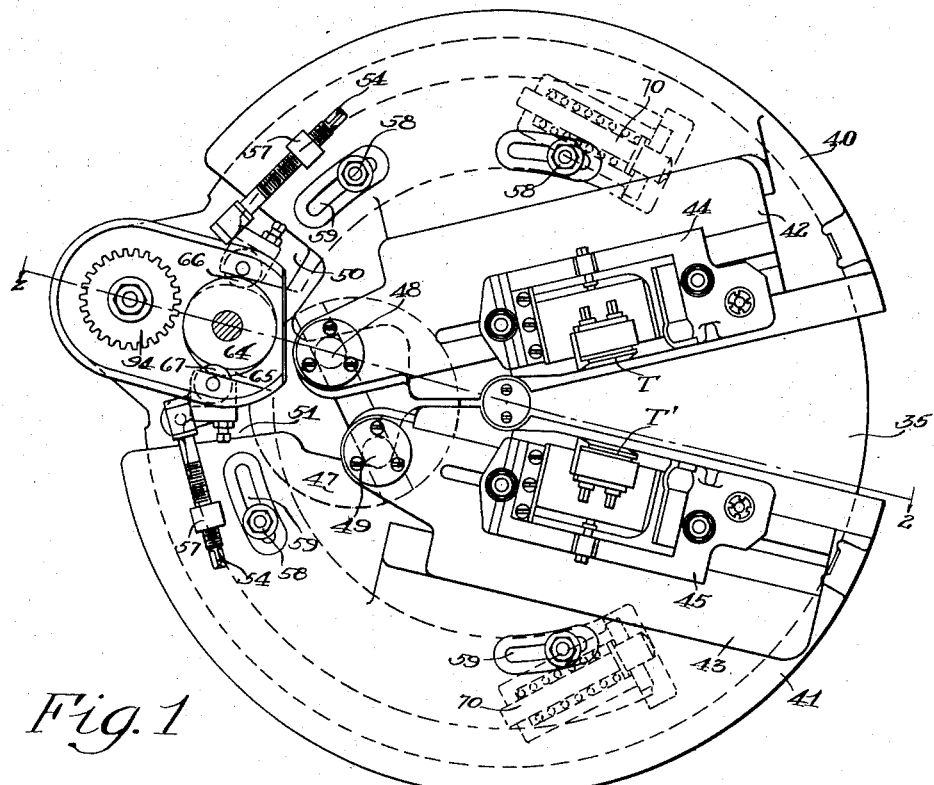
Fig. 1
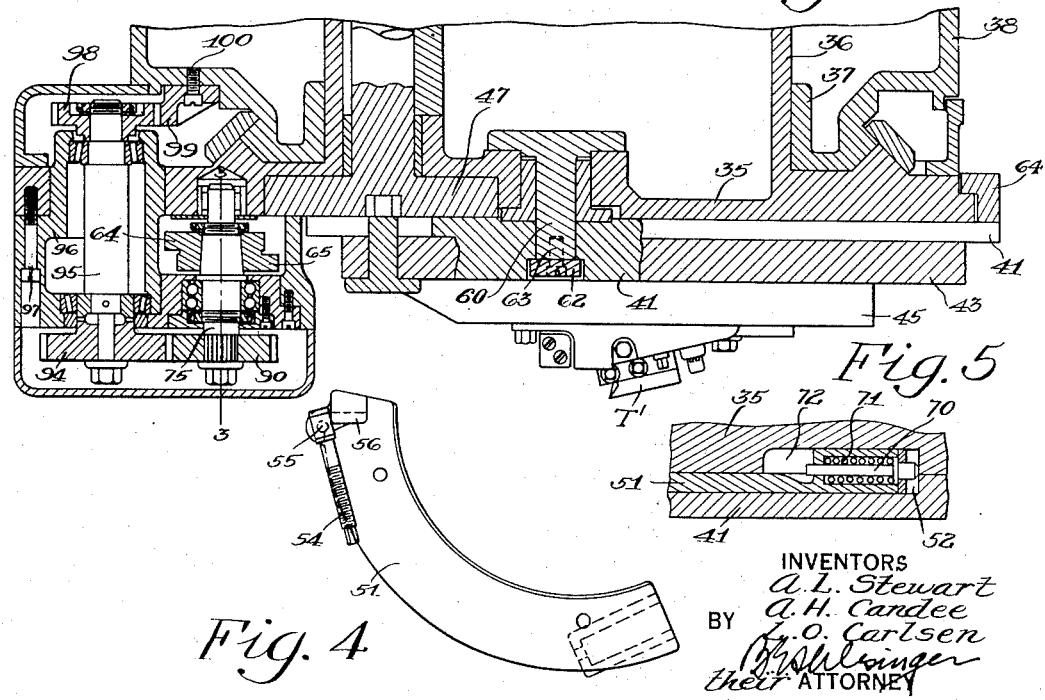
Fig. 2
Fig. 4
Fig. 5
INVENTORS
A. L. Stewart
A. H. Candee
BY H. O. Carlsen
their ATTORNEY Dec. 5, 1933.   A. L. STEWART ET AL   1,937,727
METHOD OF AND MACHINE FOR PRODUCING GEARS
Filed Oct. 8, 1931   2 Sheets-Sheet 2

INVENTORS
A. L. Stewart
A. H. Candee
L. O. Carlsen
BY
Their ATTORNEY

Patented Dec. 5, 1933

1,937,727

UNITED STATES PATENT OFFICE 1,937,727

METHOD OF AND MACHINE FOR PRODUCING GEARS

Arthur L. Stewart, Allan H. Candee, and Leonard O. Carlsen, Rochester, N. Y., assignors to Gleason Works, Rochester, N. Y., a corporation of New York Application October 8, 1931. Serial No. 567,606

32 Claims. (Cl. 90—9)

The present invention relates to a method of and a machine for producing gears.

In the copending application of Allan H. Candee and Leonard O. Carlsen, Serial No. 566,366, filed October 1st, 1931 there is described a process and machine for generating gears having teeth of non-involute profile shape. The present invention has reference, also, to the production of gears having teeth of non-involute profile shape. Its aim is to improve the process described in the copending application mentioned as regards the cutting of straight-toothed gears and particularly straight-toothed bevel gears and to simplify the gear generating machinery required.

In the art of gearing, the involute is today the standard tooth shape and gear generators are built primarily to generate teeth having involute profiles. From time to time, however, suggestions for the use of other tooth shapes are advanced, most frequently where it is sought to attain a particular object for which the involute shape is not especially suited. For instance, it has been suggested that more nearly noiseless gearing can be obtained if the height of the teeth of gears be increased to a considerable degree so as to make the teeth more flexible and in such case, it has been proposed that the sub-base portions of the elongated teeth be formed along parabolic curves to secure the requisite tooth strength. Again, it has been proposed that, in order to maintain traction under all conditions, the gears used in the differentials of motor vehicles should be provided with tooth shapes calculated to produce a variable leverage when running in mesh, and to obtain such variable leverage, tooth profiles have been suggested which are of circular arc curvature. As a further example, gears having stepped tooth profiles have been advanced as a means of obtaining increased tooth strength.

These and other types of gearing employing non-standard tooth shapes, and many more could be mentioned, have heretofore had to be cut in a forming operation or, if they could be generated, they could only be generated by the use of tools of very special shape, tools which are difficult to make and quite expensive.

In the generation of involute gears, tools of straight profile are used. One purpose of the present invention is to make it possible to generate non-involute tooth shapes also, with tools of straight profile. Through the present invention, then, there is a two-fold gain; gears which could heretofore be cut only in a forming process can now be generated, and these gears and gears, which could heretofore be generated only through use of very special tools, can now be generated in a comparatively simple and inexpensive process.

In the copending application mentioned, a method of generating non-standard gears is disclosed in which, as usual in generating gears, during the cutting operation of the tools, the blank is rotated on its axis at one velocity and simultaneously an additional relative movement of translation is produced between the tools and blank at a different velocity, but in which in contradistinction to prior generating practice, the ratio of the velocities of these movements is varied during the cutting of each tooth profile. In a broad sense, the same principles are followed in the generating process of the present invention. In the manner in which this variation of velocity ratio is obtained and in the means actually employed to affect it, the present invention distinguishes specifically from that disclosed in the copending application.

With the present invention, during the cutting operation of the tools, the blank is rotated on its axis and simultaneously the relative translatory movement is produced between the tool and the blank, and the variation in velocity between rotational and translatory movements is obtained by imparting a sidewise movement to the tool independently of the translatory movement and at a varying velocity. This sidewise movement causes the tool to produce the desired profile shape as the blank rolls under it.

The present invention may be practised in the production of various types of gears. In the drawings we have disclosed particularly how the invention may be applied to the production of straight-toothed bevel gears and to this end, we have illustrated how the Gleason standard two-tool bevel-gear generator covered by U. S. Patent No. 1,656,633 of January 17, 1928 may be modified so that it can be employed to generate bevel gears of non-involute tooth shape according to the present invention.

This machine is a two-tool generator employing two reciprocating tools to cut simultaneously opposite side-tooth surfaces of a gear blank. As this machine has been built heretofore, the two arms, on which the tool slides are mounted, have been adjustable on the face of an oscillatory cradle to permit adjustment of the angle of convergence of the cutting paths of the tools in accordance with the lengthwise taper of the teeth to be cut, but in use, the tool arms were both rigidly secured to the cradle. In the operation of this machine, heretofore, the tools were reciprocated simultaneously in opposite directions to produce the lengthwise tooth shape and simultaneously the blank and the cradle were rotated on their respective axes at uniform velocities to produce the roll required for generation of the tooth profiles, and after each tooth was cut the blank was indexed.

In modifying this machine to permit practice of the present invention, the same means heretofore used may be employed for reciprocating the tools, for rotating the blank, for oscillating the cradle and for indexing the blank after each tooth has been cut; the tool arms are adjustable angularly, as before, to allow the angle of convergence of the tool paths to be varied in accordance with the desired lengthwise taper of the teeth, but instead of fixing the tool arms rigidly to the cradle during cutting, means is provided which operates to move these arms about the axis of the cradle as the tools and blank roll together. Thus, during the generating roll, the angle of convergence or distance between the tools is varied and this variation, in combination with the other motions employed, produces the desired tooth shape.

In the drawings:

Figure 1 is an elevational view, showing how the tool end of the machine of Patent No. 1,656,633 may be modified to permit practice of the present invention;

Figure 2 is a fragmentary sectional view on the line 2—2 of Figure 1;

Figure 4 is an elevational view of one of the angularly movable slides to which one of the tool arms of the machine is adjustably secured;

Figure 5 is a fragmentary sectional view showing details of the manner in which this slide is connected at one end to the tool arm and to the cradle;

Figures 6, 7:
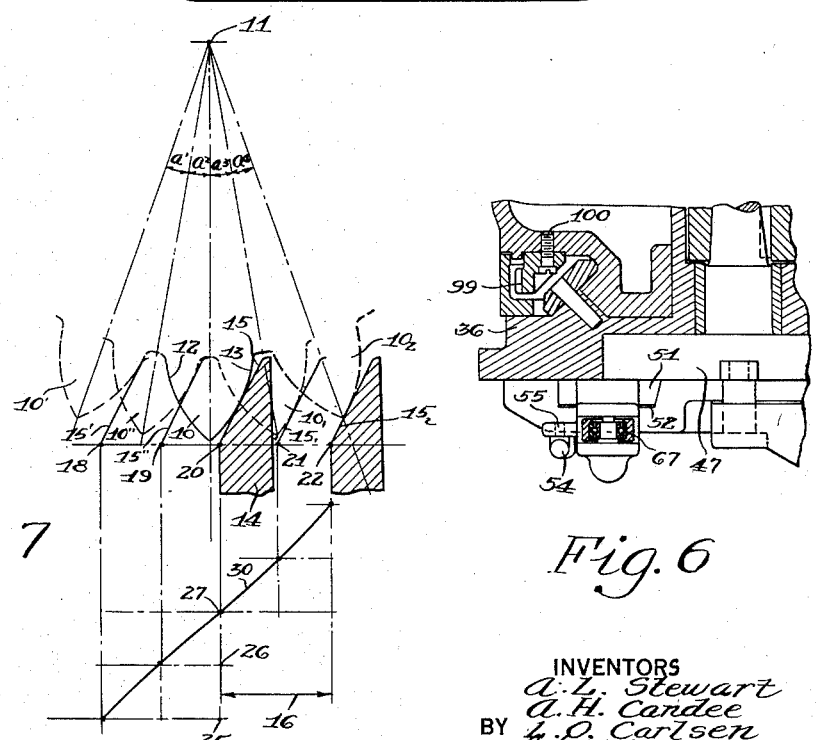
Figure 6 is a fragmentary view showing the details of the connection of the other end of this slide with a tool arm.
Figure 7 is a diagrammatic view illustrating the method of generating gears according to the present invention.

We shall refer first to Figure 7 of the drawings wherein are illustrated the basic principles underlying the present invention. 10 designates the tooth of a gear to be cut. This gear rotates about an axis 11. The profiles 12 and 13 of opposite sides of the tooth 10 are of non-involute tooth shape, specifically in the figure, circular arcs. By reason of the present invention, these profiles can be cut without the use of form-cutting tools. In fact, they can be generated and generated with simple straight-sided cutting tools. The tool for cutting one side 13 of the gear teeth is shown at 14. It has a straight cutting profile indicated at 15.

In the generation of the profile 13 of the gear tooth 10, a cutting motion is imparted to the tool and the blank is rotated on its axis 11, while a relative movement of translation is produced between the tool and blank in the direction 16. 10′, 10″, 10, 10₁ and 10₂ denote successive positions of the gear tooth 10 as it rotates about the axis 11 during the generation of the profile 13. 15′, 15″, 15, 15₁ and 15₂ denote, respectively, successive positions of the cutting edge during the generating operation. It is assumed that the gear blank is rotated at a uniform velocity about its axis 11. Thus the angular distances $a1$, $a2$, $a3$ and $a4$ are equal. It will be seen, as indicated, that in order to generate the profile 13, the cutting edge 15 must be moved in the direction 16 at a varying velocity, to maintain operative contact with the gear tooth and to roll out the desired profile shape. The distances 18—19, 19—20 etc. of successive positions of the cutting edge 15 for equi-angular movement of the blank are unequal.

Inasmuch as the rate of translatory movement of the tool can be varied within infinite limits, it will be seen that the present invention enables theoretically the generation of a profile of any desired curvature. It will be seen, further, that just as a profile 13 of a given curvature can be generated through a relative movement between an appropriate cutting edge 15 and the gear blank, so the profile 12 of the opposite side of the gear tooth can be generated to a given curvature by a given relative movement between another appropriate cutting-edge and the blank. In other words, the generation of one side of the teeth of a blank is independent of the generation of the opposite sides thereof and in cutting opposite sides of the teeth, the tools employed can be independently controlled and moved. For generating a tooth which, like that shown in Figure 7, is symmetrical, the tools will have similar but relatively reversed movements, but the movements of the two tools are at any moment independent of one another and are determined by the particular profile shape to be generated. This independence of action enables, also, the generation of gears having teeth of unsymmetrical shape.

In Figure 7, the curve of relative positions of tool and blank resulting from the particular combination of tool and blank motions required in generating a profile of the tooth 10 is plotted on a system of coordinates. As the rotation of the blank is uniform, the vertical distances 25—26, 26—27 etc. are equal, but as the translation of the tool is at a varying velocity, the horizontal distances 18—19, 19—20, etc. are unequal. The line 30 is the curve of relative positions. For the generation of a gear of involute tooth profile, this line would be straight, as is well known.

Gears can be cut with this invention with straight profiled tools of any type. Thus straight profiled grinding wheels or milling cutters having either conical or plane operating surface may be employed as well as planing tools such as now used in spur and bevel gear generators. It is to be understood, however, that, if desired, tools having curved cutting edges can also be employed, the velocity of sidewise movement of the tool being suitably modified in conformity with the shape desired to be produced on the gear tooth.

Where reciprocatory cutting tools, for instance, are employed to generate the tooth profiles the tools are reciprocated across the face of the blank as the blank rotates on its axis and as simultaneously a relative movement of translation at a varying velocity is produced between the tools and the blank. For spur gears, the tools will reciprocate in a direction parallel to the gear axis, that is, in a direction perpendicular to the plane of the drawing of Figure 7. For bevel gears, the tools will be moved across the face of the blank in converging paths in accordance with the desired taper of the gear teeth and accordingly will be moved in directions inclined to the plane of the drawing of Figure 7.

In Figures 1 to 6 inclusive, we have illustrated how this invention may be applied to the generation of bevel gears on a two-tool generator of the type shown in Patent No. 1,656,633. We have not illustrated the whole machine in the drawings of the present application but only so much thereof as is required to illustrate the present invention and as is necessary to show the modification made to permit practice of the present invention.

35 designates the face-plate of the machine. This face-plate is formed integral with the cradle 36 which rotates in the bearing 37 of the frame 38 of the machine. 40 and 41 designate, respectively, a pair of tool arms which are mounted upon the face plate for angular movement about the axis of the cradle.

42 and 43 designate the tool slides which are mounted, respectively, in the arms 40 and 41 for reciprocatory movement thereon. These slides carry the tool heads 44 and 45, respectively, which are adjustable on the slides. The cutting tools T and T' are mounted upon clapper blocks which are pivoted on the heads 44 and 45, respectively, so that the tools can be moved alternately to and from cutting position as the tool slides move in opposite directions. The tool slides are reciprocated by the crank 47 which is journaled in the cradle and which drives the tool slides through pins 48 and 49, respectively, which have block and slot connections, respectively, with the crank. The construction, mounting and operation of the tool slides and of the clapper block may be the same as disclosed in Patent No. 1,656,633 above mentioned.

In the machine of Patent No. 1,656,633, the tool arms are adjustable upon the face plate of the cradle to position the tool slides so that the tools will move along paths converging at the proper angle in accordance with the lengthwise taper of the teeth to be cut upon the blank, but when they have been adjusted they are clamped in position and remain fixed relative to the cradle during the operation of the machine. In modifying this machine to practice the present invention, provision is made for moving the tool arms angularly on the face plate of the cradle during cutting. They are adjustable, as before, as determined by the lengthwise taper of the teeth to be cut, but are movable independently of the cradle and of one another to impart the required sidewise translatory movement at varying velocities to the tools.

For the purpose of setting, the tool arm 40 is adjustable angularly on the cradle with reference to an arcuate slide 50 which adjusts in an arcuate slot cut into the back of the tool arm. Likewise, the tool arm 41 is adjustable angularly with reference to an arcuate slide 51 which is adjustable in an arcuate slot 52 cut in the rear face of the arm 41.

The adjustments of the tool arms 40 and 41 on the slides 50 and 51, respectively, are effected by turning the screws 54 which swivel, as indicated at 55 in Figure 4, on lugs 56 formed integral with the slides 50 and 51, respectively, and which thread into lugs 57 formed integral with the tool arms.

The slides 50 and 51 and the slots in the tool arms in which they are adjustable are curved about the axis of the cradle so that in their adjustments, the arms 40 and 41 are movable angularly on the cradle to determine the paths of convergence of the tools. The arms 40 and 41 are secured to the arcuate slides 50 and 51, after adjustment, by the bolts 58 which pass through arcuate slots 59 in the arms curved about the axis of the cradle and which thread into the slides. The arms adjust and move about the stud 60 which is coaxial with the cradle and the arms are held and guided on the face of the cradle by the cap member 62 which is secured to the stud 60 by the screw 63 and by the gibs 64 which are secured to the tool arms and engage over the periphery of the face plate. The gibs 64 are secured to the tool arms in any suitable manner.

Figure 3:
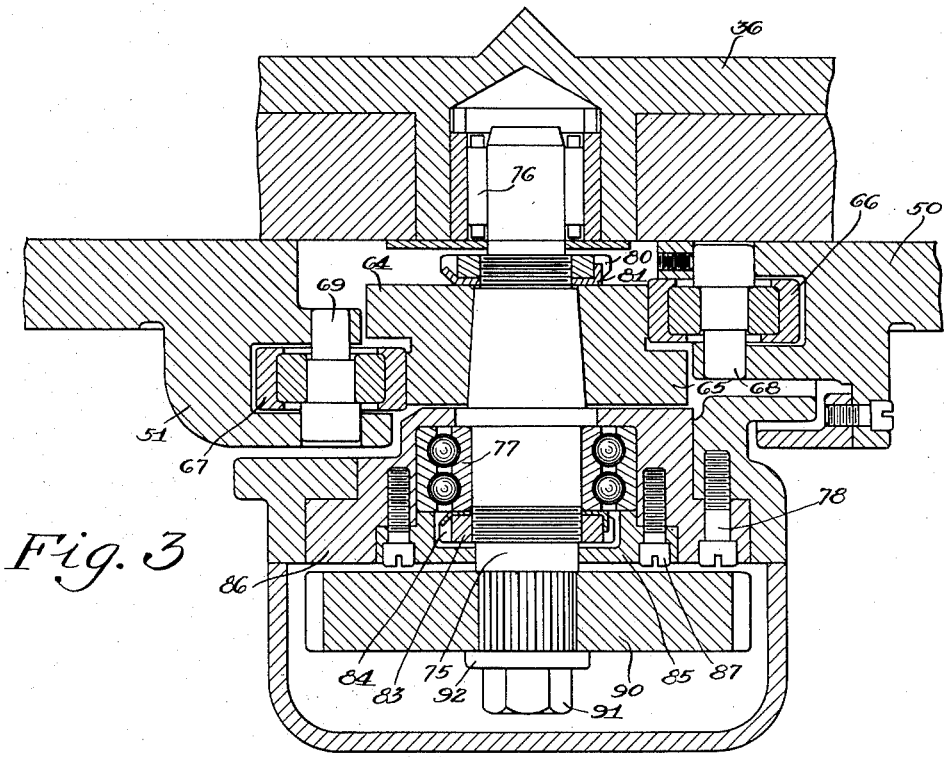
Figure 3 is a sectional view, on a much enlarged scale, taken on the line 3—3 of Figure 2.

The tool arms are rocked about the axis of the cradle during the operation of the machine to impart the required sidewise movements at varying velocities to the tools. The rocking movements are imparted to the tool arms by separate cams 64 and 65 (Figs. 2 and 3). These cams engage, respectively, with rollers 66 and 67 mounted, respectively, on anti-friction bearings on studs 68 and 69 secured in ears formed integral, respectively, with the arcuate slides 50 and 51.

As the cams rotate, they move the slides 50 and 51 about the axis of the cradle and as the tool arms 40 and 41 are secured to these slides, the tools are thereby moved about the axis of the cradle.

The rollers 66 and 67 are held in contact with the cams 64 and 65 by spring pressure, each of the arcuate slides carrying a spring-pressed plunger 70 which is housed in a recess in one end of each slide and which is pressed by a coil spring 71 into engagement with one wall of a recess 72 formed in the face of the face plate 35. The back faces of the slides 50 and 51 and of the corresponding tool arms 40 and 41 are flush and slide over the front face of the face plate 35 in their movements.

The cams 64 and 65 are formed integral with one another and are mounted upon a stud 75 which is journaled in anti-friction bearings 76 and 77 in the cradle and in the bracket 86 secured thereto by screws 78. The cams are held on a tapered portion of the stud 75 against axial movement by means of the nut 80 and lock-washer 81. A similar nut 83 and lock-washer 84 secures the anti-friction bearings 77 in position. A cap-member 85 is also provided for this purpose and it is secured to the bearing carrier 86 by screws 87.

During the cutting operation, the cams 64 and 65 are rotated to oscillate the tool arms and shift the paths of reciprocation of the cutting tools. The drive to the cam shaft will now be described.

In the operation of the machine of Patent No. 1,656,633, the cradle has an oscillatory movement at a uniform velocity which is timed with the rotation of the work spindle during cutting, the two movements producing the relative roll of tools and blank. This motion of the cradle is used in the present invention for its original purpose and is utilized in addition in the present apparatus to drive the cam shaft 75. The stud 75 is splined and has a spur gear 90 mounted thereon and secured in position by the nut 91 and washer 92. The gear 90 is driven by a pinion 94 which is secured to a shaft 95 that is journaled in anti-friction bearings in a sleeve 96 which is secured by screws 97 to the cradle. The shaft 95 carries at its rear end a spur gear 98. This spur gear 98 meshes with a spur gear segment 99 which is coaxial with the cradle and which is secured to the stationary frame of the machine by screws 100.

From the preceding description it will be seen that as the cradle oscillates on its axis, the gear 98 will be driven by engagement with the stationary segment 99 and will transmit rotation through the shaft 95 and gearing 94, 96 to the shaft 75 upon which the cams 64 and 65 are mounted. Thus, as the cradle oscillates on its axis, the cams 64 and 65 will be rotated to actuate the arcuate slides 50 and 51 and rock the tool arms, which are connected to these slides, about the axis of the cradle. It will be seen, then, that as the tools and blank roll together, the tool paths will be moved toward or away from one another causing the tools to roll out the required tooth profiles. The cams 64 and 65 transmit motion at different varying velocities to the tool arms, the motions of the two tool arms being wholly independent.

It has not been considered necessary to illustrate in the drawings of this application the means for mounting the work or for actuating the same or the cradle as these means may be identical with those disclosed in Patent No. 1,656,633. Likewise the means for feeding the work into depth and alternately withdrawing it have not been illustrated as this, too, may be identical with the mechanism disclosed in Patent No. 1,656,633. The same is true of the index mechanism.

In the cutting of a gear with the machine modified according to this invention, the tools will be reciprocated continuously through operation of the crank 47. The blank is first fed into depth. Then the generating roll of work and cradle begins. As the tools reciprocate across the face of the blank they cut opposite sides of a tooth of the blank. The blank rotates on its axis at a uniform velocity and the cradle rotates on its axis at a uniform velocity, these two elements being driven as fully disclosed in Patent No. 1,656,633. As the cradle rotates it drives the cam shaft 75 and the tool arms 40 and 41 are thus moved angularly at varying velocities to produce the sidewise translatory movements of the tools required to generate the non-involute tooth profile of the gear to be cut. The amount of sidewise movement of each tool during generation, that is, the velocity with which each tool arm moves and the amount of change of convergence of the tool paths during the roll, is determined by the confirmation of the cams 64 or 65 which actuate the arms and as these cams may be of a wide variety of shapes it will be seen that gear profiles of an infinite variety of shapes can be generated.

The tools may cut only during the roll of the cradle in one direction and be then withdrawn, or they may be fed in slightly deeper relative to the work at the end of the roll in one direction and take a final finishing cut on the return roll of the cradle. In either case, when the tooth has been completly generated, the work is withdrawn from engagement with the tools through mechanism such as described in Patent No. 1,656,633 and the work indexed. The work is then again fed into depth and a new tooth of the blank is generated.

While a particular embodiment of the invention has been described, it is to be understood that the invention is capable of various further modifications, adaptations, and uses and that this application is intended to cover any adaptations, uses, or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. The method of generating a tapered gear which comprises reciprocating a pair of tools in converging paths across the face of a gear blank to cut simultaneously opposite side tooth surfaces of the blank, and rotating the blank on its axis, while simultaneously imparting a relative movement of translation between the tools and blank in the pitch surface of a basic generating gear and varying the angle of convergence of the tool paths as the tools cut along the heights of the tooth profiles.

2. The method of producing a tapered gear which comprises reciprocating a pair of tools in converging paths across the face of a blank to cut simultaneously opposite side tooth surfaces of the blank, and rotating the blank on its axis while simultaneously imparting a relative movement of translation between the tools and blank about an axis angularly disposed to the axis of the blank and representing the axis of a basic generating gear, and varying the angles of convergence of the tool paths as the tools cut along the heights of the tooth profiles.

3. The method of producing a gear which comprises reciprocating a pair of tools across the face of a gear blank to cut simultaneously opposite side tooth surfaces of the blank and, while producing a relative rolling motion between the tools and blank, simultaneously varying the distance between the paths of the tools as they cut along the heights of the tooth profiles.

4. The method of producing a gear which comprises reciprocating a pair of tools across the face of a gear blank to cut simultaneously opposite side tooth surfaces of the blank and while producing a relative rolling motion between the tools and blank at a uniform velocity simultaneously varying the distance between the paths of the tools as they cut along the heights of the tooth profiles.

5. In a machine for producing gears, a work spindle and a pair of reciprocatory tools, means for actuating said tools, means for producing a relative rolling movement between the tools and the work spindle, and means for varying the distance between the paths of the tools at different points in the generating roll.

6. In a machine for producing gears, a work spindle, tool mechanism, an oscillatory cradle upon which one of said parts is mounted, said tool mechanism comprising a pair of reciprocatory tools, means for rotating the work spindle, means for oscillating the cradle, means for reciprocating the tools, and means for simultaneously moving the tools independently of one another about the axis of the cradle.

7. The method of producing tapered gears which comprises reciprocating a pair of tools across the face of a gear blank while rotating the blank on its axis at a uniform velocity, producing a relative swinging movement at a uniform velocity between the tools and blank about an axis angularly disposed to the axis of the blank, simultaneously rotating the tools about the same axis at a varying velocity and independently of one another, and periodically indexing the blank.

8. The method of generating a gear which comprises reciprocating a pair of tools across the face of a gear blank and rotating the blank on its axis at a uniform velocity while simultaneously producing a relative movement of translation between the tools and blank at a uniform velocity and simultaneously moving the tools independently of one another in the plane of translation at a varying velocity and periodically indexing the blank.

9. In a machine for generating gears, a work spindle, a pair of reciprocatory tools, means for reciprocating the tools, means for rotating the work spindle at a uniform velocity, means for producing a relative movement of translation between the work spindle and tools at a uniform velocity, means for moving the tools simultaneously with said rotary and translatory movements and independently of each other in the plane of translation at a varying velocity, and means for periodically indexing the work spindle.

10. In a machine for producing gears, a work spindle, an oscillatory cradle, a pair of arms mounted on the cradle for angular movement thereon, a tool slide reciprocable on each arm, means for reciprocating said slides, means for rotating the work spindle, means for oscillating the cradle, and means for simultaneously shifting said arms, said last named means comprising a pair of cams, and means operatively connecting one of said cams to each arm to move the arm on rotation of the associated cam.

11. In a machine for producing gears, a work spindle, tool mechanism, an oscillatory cradle upon which one of said parts is mounted, said tool mechanism comprising a pair of arms and a tool slide reciprocable on each arm, means for reciprocating said slides, means for rotating the work spindle, means for oscillating the cradle, and means for moving the arms during oscillation of the cradle comprising a pair of cams, means connecting said cams, respectively, with the tool arms and means operated by oscillation of the cradle for rotating said cams.

12. The method of producing a gear which comprises cutting its tooth surfaces by actuating a pair of tools, which have straight-sided operating profiles, in engagement with a gear blank to cut opposite tooth sides of the blank and while producing a relative rolling motion between the tools and blank varying the distance between the tools as they cut along the heights of the tooth profiles.

13. In a machine for producing gears, a work spindle, a pair of tools which are of straight operating profile, means for reciprocating the tools across the face of the gear blank in rectilinear, converging paths, means for producing a relative rolling motion between the tools and blank, means for varying the distance between said tools independently of their rectilinear movement as they roll over the tooth profiles of the blank, and means for periodically indexing the work spindle.

14. In a machine for producing gears, a work spindle and a tool mechanism, a carrier upon which one of said parts is mounted, said tool mechanism comprising a tool having an operating portion of straight profile, means for actuating the tool mechanism, means for rotating the work spindle and for simultaneously moving said carrier to produce a relative rolling motion between the tool mechanism and the work, means for moving the tool mechanism relative to the carrier in the same plane as the carrier movement during the rolling motion, and means for periodically indexing the work spindle.

15. In a machine for producing tapered gears, a work spindle and a tool, an oscillatable cradle upon which one of said parts is mounted, said tool having an operating portion of straight profile, an arm movable about the axis of the cradle and on which said tool is mounted, means for actuating the tool, means for rotating the work spindle and simultaneously oscillating the cradle, means for simultaneously moving said arm and means for periodically indexing the work spindle.

16. In a machine for producing tapered gears, a work spindle and a tool, an oscillatable cradle upon which one of said parts is mounted, said tool having a cutting portion of straight profile, means for actuating the tool, an arm movable about the axis of the cradle and on which said tool is mounted, means for rotating the work spindle and simultaneously oscillating the cradle, means operated by the movement of the cradle for moving said arm, and means for periodically indexing the work spindle.

17. The method of generating the teeth of a bevel gear which comprises rotating the gear blank on its axis while reciprocating a pair of tools across the face of the blank on lines passing through its cone apex and simultaneously rotating both of said tools about a second axis intersecting the cone apex of the blank with respectively differing and varying angular velocities.

18. In a machine for producing gears, a work spindle, a tool mechanism, a cradle upon which one of said parts is mounted, said tool mechanism comprising a pair of reciprocating tools, means for rotating the work spindle, means for oscillating the cradle, means for reciprocating the tools, and means for simultaneously moving the tools independently of one another about the axis of the cradle at different velocities.

19. The method of producing a gear which comprises reciprocating a tool having a side cutting edge across the face of a gear blank while rotating the blank on its axis and simultaneously producing a relative movement of translation between the tool and blank at a uniform velocity in the pitch surface of a basic generating gear, and moving the tool sidewise in the pitch plane of the generating gear independently of said relative translatory movement as the tool cuts along the height of the tooth profiles.

20. The method of producing a gear which comprises moving a tool across the face of a gear blank and while rotating the blank on its axis and simultaneously producing a relative movement of translation between the tool and blank at a uniform velocity in the pitch surface of a basic generating gear, shifting the tool sidewise in the pitch plane of the generating gear independently of said relative translatory movement as the tool cuts along the height of the tooth profiles.

21. The method of producing a gear which comprises moving a tool across the face of a gear blank and, while rotating the blank on its axis and simultaneously producing a relative movement of translation between the tool and blank at a uniform velocity in the pitch surface of a basic generating gear, shifting the tool sidewise in the pitch surface of the generating gear independently of said relative translatory movement and at a varying velocity as the tool cuts along the height of the tooth profiles.

22. The method of producing a gear which comprises moving a tool across the face of a gear blank while rotating the blank on its axis and simultaneously producing a relative movement between the tool and blank about an axis angularly disposed to the blank axis and representing the axis of a basic generating gear, and shifting the tool angularly about the last named axis and independently of the last named movement as the tool cuts along the height of the tooth profiles.

23. The method of producing a gear which comprises moving a tool across the face of a gear blank while rotating the blank on its axis and simultaneously producing a relative movement between the tool and blank about an axis angularly disposed to the blank axis and representing the axis of a basic generating gear, and shifting the tool angularly about the last named axis and independently of the last named movement at a varying velocity as the tool cuts along the height of the tooth profiles.

24. The methods of producing a gear which comprises moving a pair of tools in converging paths across the face of a gear blank while rotating the blank on its axis and simultaneously producing a relative movement between the tool and blank about an axis angularly disposed to the axis of the blank and representing the axis of a basic generating gear, and simultaneously imparting an independent movement to the tools about the last named axis as the tools cut along the heights of the tooth profiles.

25. The method of producing a gear which comprises moving a pair of tools in converging paths across the face of a gear blank while rotating the blank on its axis and simultaneously producing a relative movement between the tools and blank about an axis angularly disposed to the axis of the blank and representing the axis of a basic generating gear, and simultaneously imparting an independent movement to the tools about the last named axis at a varying velocity as the tools cut along the heights of the tooth profiles.

26. In a machine for producing gears, a work spindle, a tool mechanism, a carrier upon which one of said parts is mounted, means for actuating the tool mechanism, means for rotating the work spindle and for simultaneously moving the carrier to effect a relative rolling movement between the tool mechanism and work, and means for moving the tool mechanism sidewise in the surface of the relative rolling movement as the tool rolls along the heights of the tooth profiles of the work.

27. In a machine for producing gears, a work spindle, tool mechanism, a carrier upon which one of said parts is mounted, means for actuating the tool mechanism, means for rotating the work spindle and for simultaneously moving the carrier to effect a relative rolling movement between the tool mechanism and work, and means for moving the tool mechanism sidewise at a varying velocity in the surface of the relative rolling movement as the tool rolls along the heights of the tooth profiles of the work.

28. In a machine for producing gears, a work spindle, a tool mechanism, a cradle upon which one of said parts is mounted, means for actuating the tool mechanism, means for rotating the work spindle and for simultaneously rotating the cradle to effect a relative rolling movement between the tool mechanism and work, and means for moving the tools angularly about the axis of the cradle at a varying velocity and independently of the cradle movement as the tool rolls along the heights of the tooth profiles of the blank.

29. In a machine for producing gears, a work spindle, a tool mechanism, a cradle upon which one of said parts is mounted, said tool mechanism comprising a pair of tools reciprocable in converging paths across the face of a gear blank, means for reciprocating the tools, means for rotating the work spindle and for simultaneously rotating the cradle to effect a relative rolling movement between the tool mechanism and the work, and means for varying the angle of convergence of the tool paths as the tools roll along the heights of tooth profiles of the work.

30. In a machine for producing gears, a work spindle, tool mechanism, a cradle upon which one of said parts is mounted, said tool mechanism comprising a pair of tools reciprocable in converging paths across the face of the blank, means for reciprocating the tools, means for rotating the work spindle and for simultaneously rotating the cradle to effect a relative rolling movement between the tool mechanism and the work, and means for moving the tools about the axis of the cradle independently of one another and independently of the cradle rotation as the tools roll along the heights of tooth profiles of the blank.

31. In a machine for producing gears, a work spindle, tool mechanism, a cradle upon which one of said parts is mounted, said tool mechanism comprising a pair of tools reciprocable in converging paths across the face of the blank, means for reciprocating the tools, means for rotating the work spindle and for simultaneously rotating the cradle to effect a relative rolling movement between the tool mechanism and the blank, and means operable by the cradle movement for varying the angle of convergence of the tool paths as the tools roll along the heights of the tooth profiles of the blank.

32. In a machine for producing gears, a work spindle, tool mechanism, a cradle upon which one of said parts is mounted, said tool mechanism comprising a pair of tools reciprocable in converging paths across the face of the blank, means for reciprocating the tools, means for rotating the work spindle and for simultaneously rotating the cradle to effect a relative rolling movement between the tool mechanism and the blank and means operable by the cradle movement for moving the tools about the axis of the cradle independently of one another and independently of the cradle rotation as the tools roll along the heights of tooth profiles of the blank.

ARTHUR L. STEWART.
ALLAN H. CANDEE.
L. O. CARLSEN.